United States Patent
Shroff et al.

(10) Patent No.: US 12,101,549 B2
(45) Date of Patent: Sep. 24, 2024

(54) CAMERA CONTROL USING SYSTEM SENSOR DATA

(71) Applicant: Meta Platforms Technologies, LLC, Menlo Park, CA (US)

(72) Inventors: Sapna Shroff, Burlingame, CA (US); Linsen Bie, San Francisco, CA (US); Jun Hu, San Jose, CA (US); David Tao, Atherton, CA (US); Demetrios Basil Karanikos, San Francisco, CA (US); Sebastian Sztuk, Menlo Park, CA (US); Zhaonian Zhang, Sunnyvale, CA (US); Jiangtao Kuang, San Jose, CA (US); Danni Luo, Sunnyvale, CA (US); Yilei Li, Fremont, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/856,760

(22) Filed: Jul. 1, 2022

(65) Prior Publication Data
US 2023/0012426 A1 Jan. 12, 2023

Related U.S. Application Data

(60) Provisional application No. 63/227,228, filed on Jul. 29, 2021, provisional application No. 63/219,266, filed on Jul. 7, 2021.

(51) Int. Cl.
*H04N 23/62* (2023.01)
*G02B 27/01* (2006.01)
(Continued)

(52) U.S. Cl.
CPC .......... *H04N 23/62* (2023.01); *G02B 27/017* (2013.01); *G02B 27/0179* (2013.01);
(Continued)

(58) Field of Classification Search
CPC ...... H04N 23/62; H04N 23/64; H04N 23/667; H04N 23/90; H04N 23/617; H04N 23/65;
(Continued)

(56) References Cited

U.S. PATENT DOCUMENTS

2016/0057339 A1 2/2016 Raffle et al.
2017/0115742 A1* 4/2017 Xing ..................... G06F 3/0485
(Continued)

FOREIGN PATENT DOCUMENTS

WO 2018127782 A1 7/2018

OTHER PUBLICATIONS

EPO—International Search report and Written Opinion for International Application No. PCT/US2022/036343, mailed Nov. 3, 2022, 12 pages.

*Primary Examiner* — Ahmed A Berhan
(74) *Attorney, Agent, or Firm* — McDermott Will & Emery LLP

(57) ABSTRACT

A method for using cameras in an augmented reality headset is provided. The method includes receiving a signal from a sensor mounted on a headset worn by a user, the signal being indicative of a user intention for capturing an image. The method also includes identifying the user intention for capturing the image, based on a model to classify the signal from the sensor according to the user intention, selecting a first image capturing device in the headset based on a specification of the first image capturing device and the user intention for capturing the image, and capturing the image with the first image capturing device. An augmented reality headset, a memory storing instructions, and a processor to execute the instructions to cause the augmented reality headset as above are also provided.

20 Claims, 5 Drawing Sheets

(51) Int. Cl.
    *G06F 3/01* (2006.01)
    *G06F 3/16* (2006.01)
    *H04N 23/60* (2023.01)
    *H04N 23/667* (2023.01)
    *H04N 23/90* (2023.01)

(52) U.S. Cl.
    CPC .............. *G06F 3/012* (2013.01); *G06F 3/013* (2013.01); *G06F 3/017* (2013.01); *H04N 23/64* (2023.01); *H04N 23/667* (2023.01); *H04N 23/90* (2023.01); *G02B 2027/0138* (2013.01); *G02B 2027/014* (2013.01); *G06F 3/167* (2013.01)

(58) Field of Classification Search
    CPC .. H04N 23/66; G02B 27/017; G02B 27/0179; G02B 2027/0138; G02B 2027/014; G02B 27/0101; G02B 2027/0187; G06F 3/012; G06F 3/013; G06F 3/017; G06F 3/167; G06F 3/015; G06F 3/016
    See application file for complete search history.

(56) References Cited

U.S. PATENT DOCUMENTS

| | | | |
|---|---|---|---|
| 2017/0176748 A1* | 6/2017 | Kim | ...................... G06T 19/006 |
| 2019/0068881 A1 | 2/2019 | Kim | |
| 2021/0117712 A1 | 4/2021 | Huang et al. | |
| 2022/0179665 A1* | 6/2022 | Rathod | ................... G06F 9/451 |

* cited by examiner

CAMERA CONTROL USING SYSTEM SENSOR DATA

CROSS-REFERENCE TO RELATED APPLICATIONS

The present disclosure is related and claims priority under 35 USC. § 119(e) to U.S. Prov. Pat. Appln. No. 63/227,228, entitled CAMERA CONTROL USING SYSTEM SENSOR DATA, filed on Jul. 29, 2021, and to U.S. Prov. Pat. Appln. No. 63/219,266, entitled CAMERA CONTROL USING SYSTEM SENSOR DATA, filed on Jul. 7, 2021, to Sapna SHROFF et-al., the contents of which applications are hereby incorporated herein by reference in their entirety, for all purposes.

BACKGROUND

Field

The present disclosure is related to user interfaces in smart glass devices that include one or more cameras for recording images and video. More specifically, the present disclosure is related to methods for automatically selecting a camera from the one or more cameras for the smart glass device whose settings are better suited for collecting an image based on user input and gestures.

Related Art

In today's wearable platforms, the devices include multiple cameras, sensors, and actuators configured to perform multiple ad-hoc functions. In some instances, more than one of these accessory devices may be operational at the same time, while only one of them provides the best use of capabilities for the task at hand. However, these multiple devices typically lack an automated mechanism for activating or de-activating, thereby resulting in cumbersome user interaction to select the devices to be operative for a selected task, or the waste of scarce power resources in having a non-operational, active device.

SUMMARY

In a first embodiment, an augmented reality headset includes a first camera and a second camera mounted on a frame, having a first field of view, and a second field of view, respectively, a sensor mounted on the frame, a memory configured to store multiple instructions, and one or more processors configured to execute the instructions to cause the augmented reality headset to perform a method. The method include processes to: receive a signal from the sensor mounted, the signal being indicative of an intention of a user for capturing an image, identify the intention of the user for capturing the image, based on a model to classify the signal from the sensor according to the intention of the user, select one of the first camera or the second camera based on the first field of view, the second field of view, and the intention of the user for capturing the image and to capture the image with a selected camera.

In a second embodiment, a computer-implemented method includes receiving a signal from a sensor mounted on a headset worn by a user, the signal being indicative of a user intention for capturing an image. The computer-implemented method also includes identifying the user intention for capturing the image, based on a model to classify the signal from the sensor according to the user intention, selecting a first image capturing device in the headset based on a specification of the first image capturing device and the user intention for capturing the image, and capturing the image with the first image capturing device.

In a third embodiment, a non-transitory, computer-readable medium stores instructions which, when executed by one or more processors, cause a computer to execute a method. The method includes receiving a signal from a sensor mounted on a headset worn by a user, the signal being indicative of a user intention for capturing an image. The method also includes identifying the user intention for capturing the image, based on a model to classify the signal from the sensor according to the user intention, selecting a first image capturing device in the headset based on a specification of the first image capturing device and the user intention for capturing the image, and capturing the image with the first image capturing device.

Figure 1:
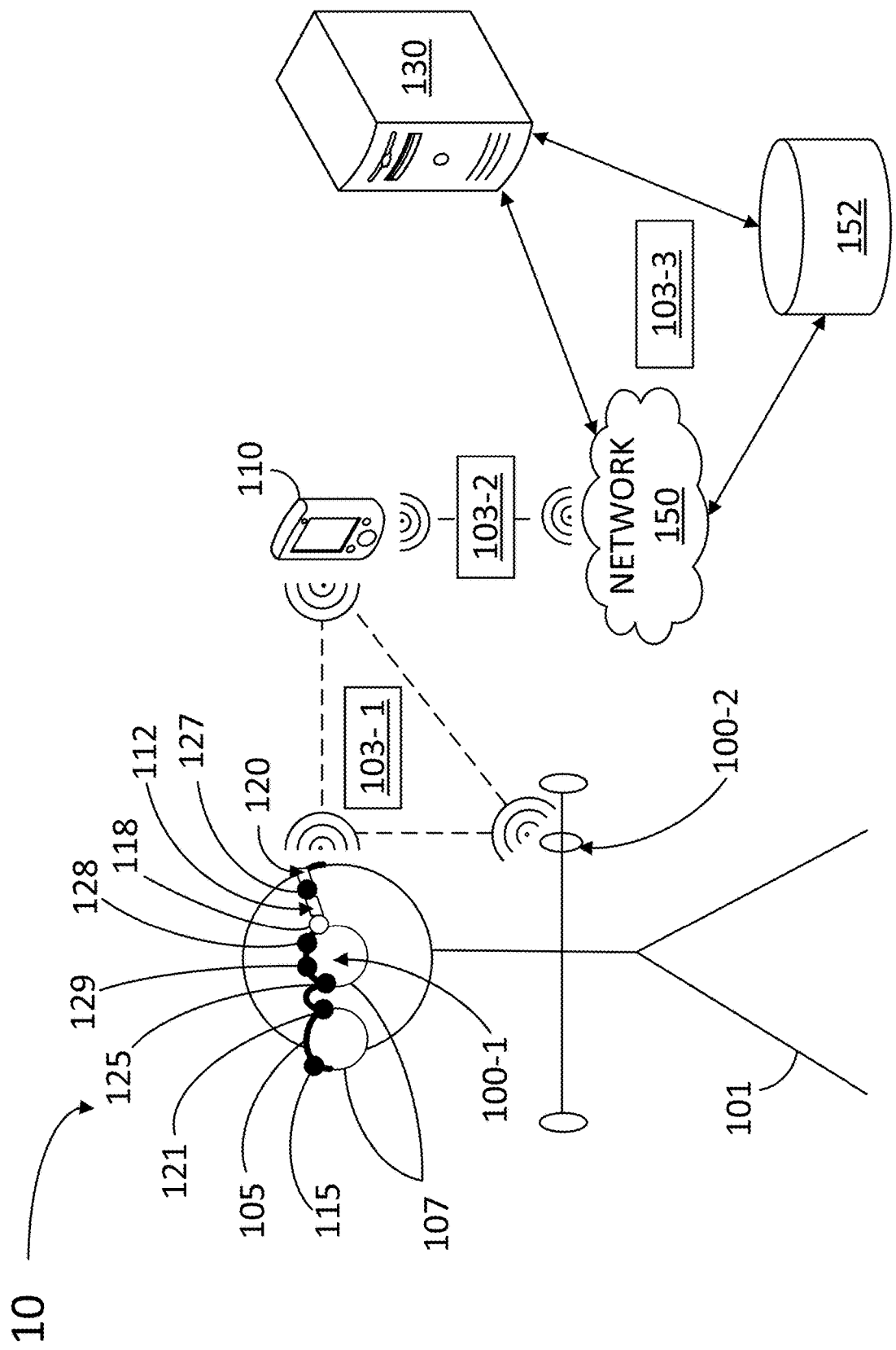
FIG. 1 illustrates an architecture including one or more wearable devices coupled to one another, to a mobile device, a remote server and to a database, according to some embodiments.

In the figures, elements having the same or similar label number share the same or similar features, unless stated explicitly otherwise.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure. Embodiments as disclosed herein should be considered within the scope of features and other embodiments illustrated in Appendix I, filed concurrently herewith.

A multi-camera or multi-imager smart glass system may include multiple cameras or imagers that may serve different functions. For instance, a system may have cameras that point in different directions so that each covers different portions of a view-sphere. In some embodiments, it is possible to keep all, most, or at least some of the cameras ON at all times, or substantially at all times, or most of the time, or at least for some time to ensure complete coverage of the view-sphere. However, this consumes power, creates unnecessary data, and subsequent management, and is generally inefficient. Hence, it is desirable to control the system efficiently, by triggering capture from only those cameras that would view relevant activity.

Manually controlling such a system by directly controlling and triggering or switching each camera ON-OFF based on view and relevant activity moment-by-moment could be an inconvenient and disruptive experience for a user. Hence, there is a need for a system level auto-detection of relevant activity to use for efficient and unsupervised/minimally-supervised camera control.

We propose a system level method to detect relevant activity to use for efficient and unsupervised/minimally-supervised camera control. We consider an embodiment of a multi-view system, with multiple cameras capturing different portions of a view-sphere. In some embodiments, the system is built-in or attached to a pair of spectacles.

A system as disclosed herein uses sensors on the device, such as camera image streams, hand gestures, IMU data, audio cues, or a few active button presses which can be used alone or in combination to estimate where the relevant activity may be occurring in the user's view-sphere. Eye tracking sensors may be used to determine the gaze of the user. IMU data may be used to determine the head angle, indicating whether they are looking ahead or looking downwards. Hand gestures captured by a camera stream may indicate current region of interest. Audio cues may signal for instance the name of a person that needs to be captured. A camera stream may be used to detect and recognize or track the relevant person in the field of view. Location and context sensing may be used to establish relevance of activity. These data could be used singly or in combination to estimate the region of relevance. The system may apply use case prioritized models or learn appropriate models with machine learning/deep learning from various use situations to arrive at good estimates. Once the relevant region is identified, the system could trigger events required for the appropriate camera such as appropriate exposure/other control and full capture.

The user would like to capture their view facing distant scenery with a camera that faces forward, and perhaps has a large field of view. When the user looks down towards their hands, say, as they frost cookies or make any other detailed manual work, they may need to switch to a different downward facing camera with a different field of view and possibly different image quality (for example, a narrower field of view with a higher resolution).

FIG. 1 illustrates an architecture 10 including one or more wearable devices 100-1 (e.g., a smart glass) and 100-2 (e.g., a smart watch) coupled to one another (hereinafter, collectively referred to as "wearable devices 100"), to a mobile device 110, a remote server 130, and to a database 152, according to some embodiments. Smart glass 100-1 may be configured for AR/VR applications, and mobile device 110 may be a smart phone, all of which may communicate with one another via wireless communications and exchange a first dataset 103-1. Dataset 103-1 may include a recorded video, audio, or some other file or streaming media. A user 101 of wearable devices 100 is also the owner or is associated with mobile device 110. In some embodiments, the smart glass may directly communicate with the remote server, the database, or any other client device (e.g., a smart phone of a different user, and the like) via the network. The mobile device may be communicatively coupled with a remote server and a database via a network 150, and transmit/share information, files, and the like with one another, e.g., dataset 103-2 and dataset 103-3 (hereinafter, collectively referred to as "datasets 103"). Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Smart glass 100-1 may include a frame 105 including eyepieces 107 to provide an image to user 101. A camera 115 (e.g., forward-looking) is mounted on frame 105, and has a field of view (FOV). A sensing device 128 facing the user is configured to track a pupil position of the user. Processor 112 is configured to identify a region of interest (ROI) within the image viewed by user 101. An interface device 129 indicates to user 101 that the FOV of camera 115 at least partially misses the ROI of the user. In some embodiments, smart glass 100-1 may also include a haptic actuator 125 to recreate a sense of touch to the user, for a VR/AR application, and a speaker 127 to communicate to user 101 voice or sound signals indicative of adjusting a gaze direction for improving the FOV of camera 115 (e.g., obtained with pupil tracking information from sensing device 128). For example, in some embodiments, haptic actuator 125 may include a vibrating component to indicate to the user to nudge their head position in a desired direction to align the FOV of forward-looking camera 115 with the ROI, or to confirm to the user that the FOV is properly centered on the ROI.

In some embodiments, smart glass 100-1 may include multiple sensors 121 such as IMUs, gyroscopes, microphones, and capacitive sensors configured as touch interfaces for the user. Other touch sensors may include a pressure sensor, a thermometer, and the like.

In addition, wearable devices 100, or mobile device 110, may include a memory circuit 120 storing instructions, and a processor circuit 112 configured to execute the instructions to cause smart glass 100-1 to perform, at least partially, some of the steps in methods consistent with the present disclosure. Memory circuit 120 may also store data, such as calibration data for the position and orientation of camera 115 relative to the FOV of the user. In some embodiments, smart glass 100-1, mobile device 110, server 130, and/or database 152 may further include a communications module 118 enabling the device to wirelessly communicate with remote server 130 via network 150. Smart glass 100-1 may thus download a multimedia online content (e.g., dataset 103-1) from remote server 130, to perform at least partially some of the operations in methods as disclosed herein. In some embodiments, memory 120 may include instructions to cause processor 112 to receive and combine signals from sensors 121, avoid false positives, and better assess user intentions and commands when an input signal is received from a user interface.

Figure 2A:
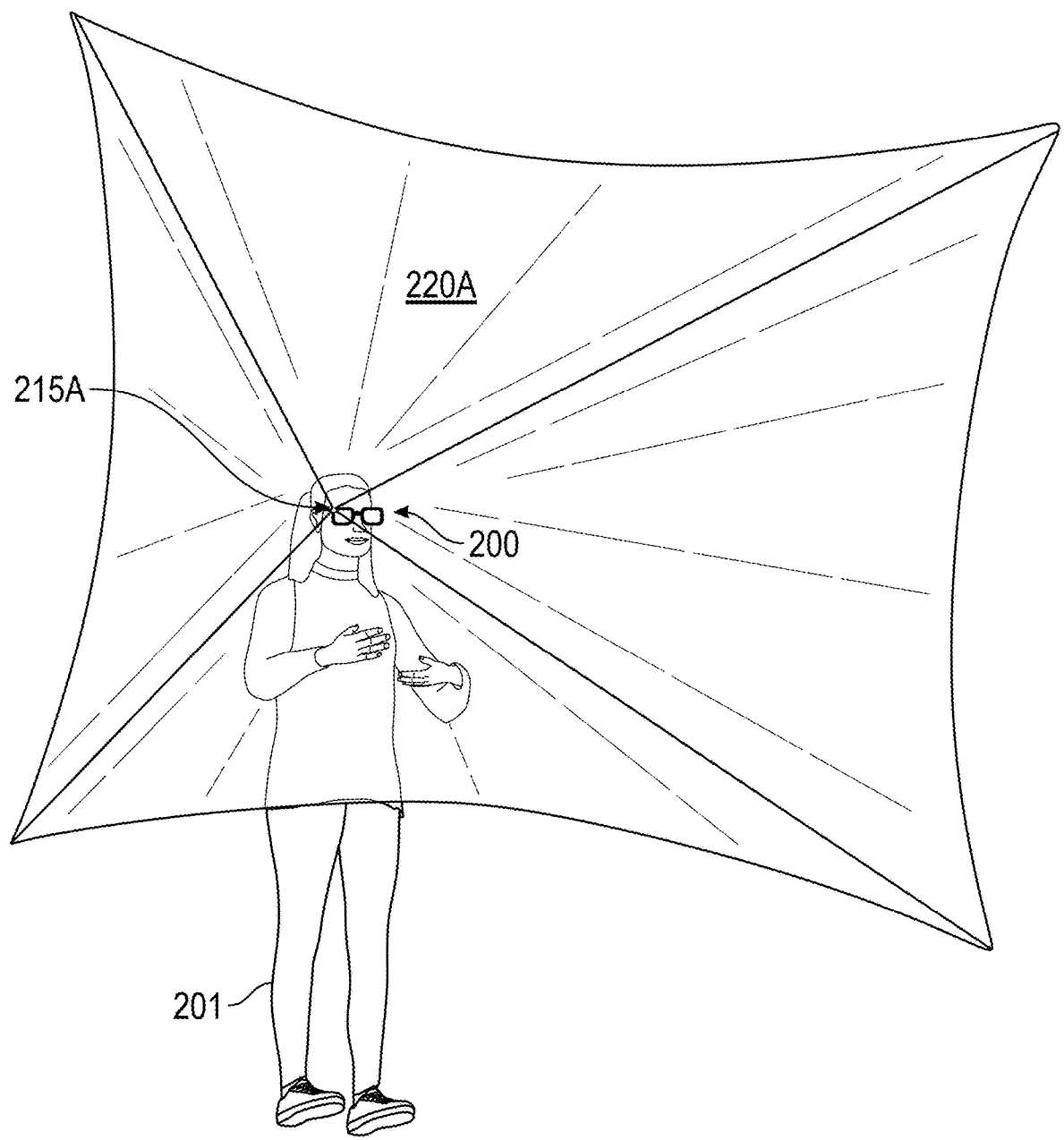
FIG. 2A illustrates a user with a smart glass in a first configuration, according to some embodiments.
Figure 2B:
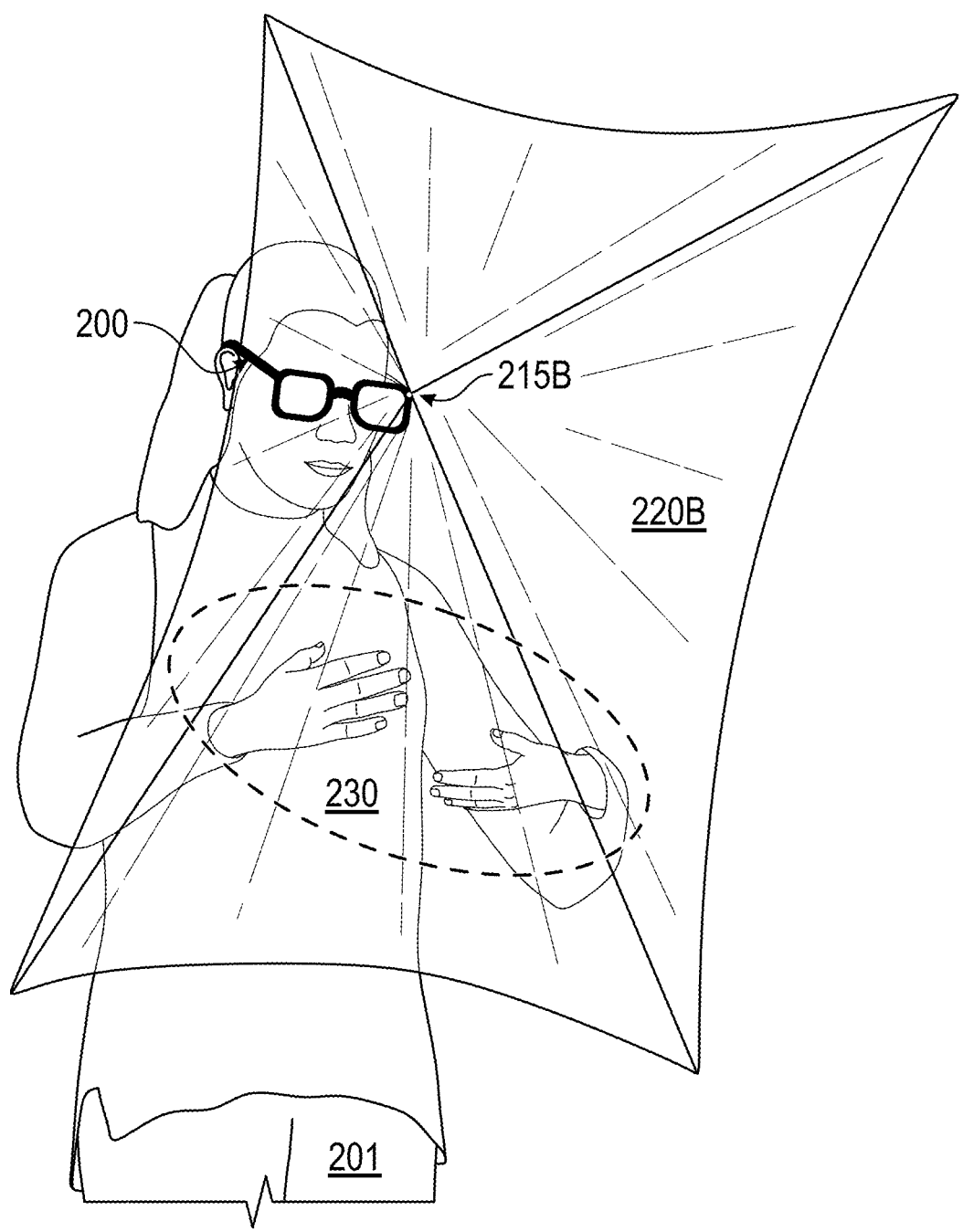
FIG. 2B illustrates a user with a smart glass in a second configuration, according to some embodiments.

FIGS. 2A-2B illustrate two configurations with a user 201 wearing smart glass 200. Smart glass 200 includes two cameras 215A and 215B (hereinafter, collectively referred to as "cameras 215"). Cameras 215 have each field of view, FOV 220A and 220B, respectively (hereinafter, collectively referred to as "FOVs 220"). FOVs 220 are generally different, and their characteristics depend on the specifications of cameras 215. For example, FOV 220A points straight ahead of the face of user 201, and is wider than FOV 220B, which points straight down, close to the user's body.

FIG. 2A illustrates a user 201 with smart glass 200 in a first configuration, according to some embodiments. Accordingly, user 201 may be focused on an item straight ahead of her, and therefore, first camera 215A (at the top of the user's right eyepiece) may be better suited to capture an image of an object of interest within a user FOV 200A. A system as disclosed herein then selects to activate camera 215A as illustrated, having an angle of view straight ahead of the user, and a wide field of view 220A.

FIG. 2B illustrates user 201 with smart glass 200 in a second configuration, according to some embodiments. Accordingly, in this second configuration, user 201 may be focused on an item 230 within narrower field of view 220B, straight below from the user's face, at the level of the user's hands. In this case, a system as disclosed herein may select to activate a second camera 215B, at the top of the user's left eyepiece, which may be configured with a down looking, narrower field of view 220B (in comparison with the first camera).

In some embodiments, the system is configured to automatically switch between the first camera and the second camera as the user switches attitude and pose, without need for a user input. In some embodiments, a certain degree of user input may be desirable, when there is ambiguity between different user gestures, or when the two or more cameras may have competitive specifications in relation to the object of interest for the user.

Figure 3:
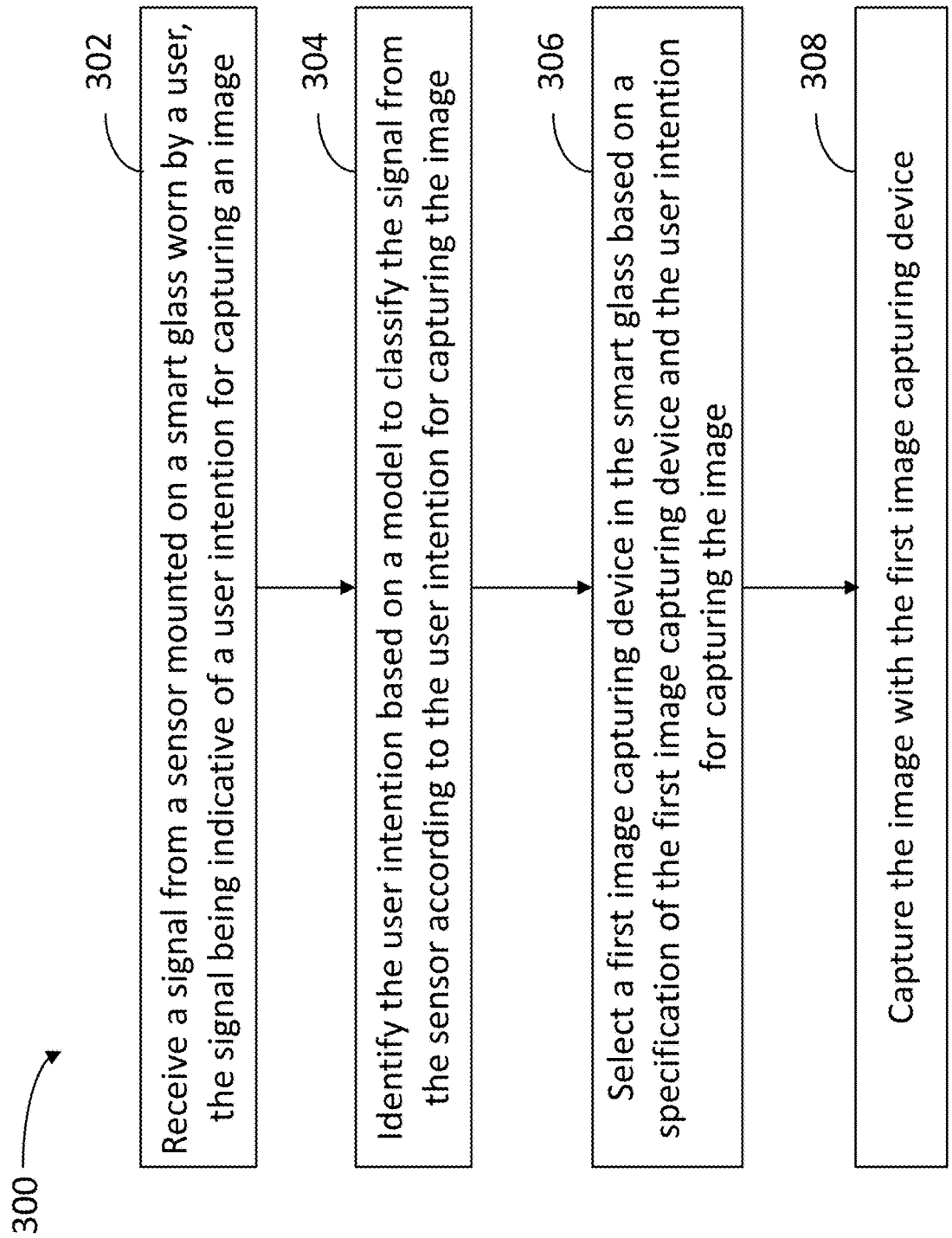
FIG. 3 is a flow chart illustrating steps in a method for controlling one or more cameras in a smart glass device using multiple sensor data, according to some embodiments.

FIG. 3 is a flow chart illustrating steps in a method 300 for controlling one or more cameras in a smart glass device using multiple sensor data (e.g., smart glasses 100 and 200, and sensors 121), according to some embodiments. The smart glass may also include one or more cameras, a sensing device, a microphone, a speaker, and a haptic actuator mounted on a frame (e.g., camera 115, sensing device 128, interface device 129, speaker 127, and haptic actuator 125). The smart glass may also include a communications module 118 to transmit and receive datasets with a mobile device or a server, through a network, while performing one or more steps in method 300 (e.g., communications module 118, client device 110, server 130, datasets 103, and network 150). In embodiments consistent with the present disclosure, at least one of the steps in method 300 may be performed by a processor executing instructions stored in a memory circuit (e.g., processor 112, memory 120). In some embodiments, a method consistent with the present disclosure may include one or more of the steps in method 300 performed in a different order, simultaneously, quasi-simultaneously, or overlapping in time.

Step 302 includes receiving a signal from a sensor mounted on a smart glass worn by a user, the signal being indicative of a user intention. In some embodiments, step 302 includes one of receiving an inertial signal from an inertial motion sensor, receiving a sound capture from a user voice, receiving a hand gesture, or receiving an active button press. In some embodiments, step 302 includes identifying a hand gesture of the user indicative of an object of interest. In some embodiments, step 302 includes receiving a pupil position of the user from an eye tracking device mounted on the headset. In some embodiments, step 302 includes identifying an orientation of the headset, and selecting the first image capturing device comprises selecting a camera whose field of view is aligned with the orientation of the headset.

Step 304 includes identifying the user intention based on a model to classify the signal from the sensor according to the user intention.

Step 306 includes selecting a first image capturing device in the smart glass based on a specification of the first image capturing device and the user intention. In some embodiments, step 306 includes selecting the first image capturing device when a field of view of the first image capturing device includes a point of interest in a field of view for the user, in the smart glass. In some embodiments, step 306 includes de-activating the at least one image capturing device in the smart glass when the user intention is incompatible with the specification of the image capturing device. In some embodiments, step 306 includes selecting, from one or more image capturing devices in the smart glass, the image capturing device whose specification best matches the user intention. In some embodiments, step 306 includes selecting a second image capturing device and de-activating the first image capturing device based on a second user intention. In some embodiments, the specification of the first image capturing device is a field of view, and step 306 includes verifying that the field of view includes an object of interest identified within the user intention.

Step 308 includes capturing the image with the first image capturing device.

The subject technology is illustrated, for example, according to various aspects described below. Various examples of aspects of the subject technology are described as numbered claims (claim 1, 2, etc.) for convenience. These are provided as examples, and do not limit the subject technology.

In one aspect, a method may be an operation, an instruction, or a function and vice versa. In one aspect, a claim may be amended to include some or all of the words (e.g., instructions, operations, functions, or components) recited in either one or more claims, one or more words, one or more sentences, one or more phrases, one or more paragraphs, and/or one or more claims.

Hardware Overview

Figure 4:
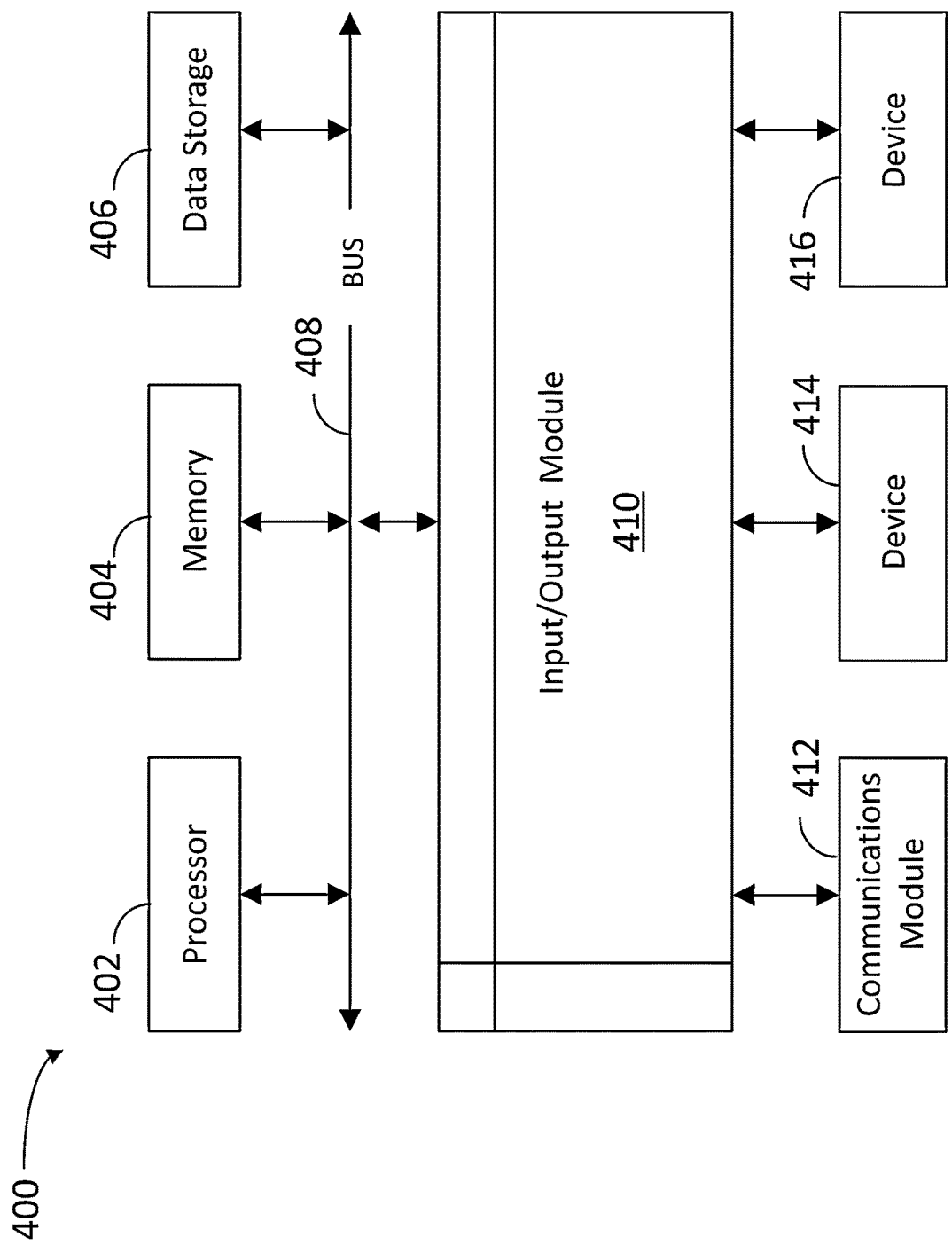
FIG. 4 is a block diagram illustrating an exemplary computer system with which a headset and methods for use of the same can be implemented, according to some embodiments.

FIG. 4 is a block diagram illustrating an exemplary computer system 400 with which the headset 100 of FIG. 1, and method 300 can be implemented, according to some embodiments. In certain aspects, computer system 400 may be implemented using hardware or a combination of software and hardware, either in a dedicated server, or integrated into another entity, or distributed across multiple entities. Computer system 400 may include a desktop computer, a laptop computer, a tablet, a phablet, a smartphone, a feature phone, a server computer, or otherwise. A server computer may be located remotely in a data center or be stored locally.

Computer system 400 includes a bus 408 or other communication mechanism for communicating information, and a processor 402 (e.g., processor 112) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, e.g., one or more modules of computer program instructions encoded on a computer-readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled with bus 408 for storing information and instructions. Computer system 400 may be coupled via input/output module 410 to various devices. Input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, input/output module 410 is configured to connect to a plurality of devices, such as an input device 414 and/or an output device 416. Exemplary input devices 414 include a keyboard and a pointing device, e.g., a mouse or a trackball, by which a consumer can provide input to the computer system 400. Other kinds of input devices 414 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 416 include display devices, such as an LCD (liquid crystal display) monitor, for displaying information to the consumer.

According to one aspect of the present disclosure, wearable devices 100 can be implemented, at least partially, using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires forming bus 408. Common forms of machine-readable media include, for example, floppy disk, a flexible disk, hard disk, magnetic tape, any other magnetic medium, a CD- ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the user technology, the disclosure, the present disclosure, other variations thereof and alike are for convenience only and do not imply that a disclosure relating to such phrase(s) is essential to the user technology or that such disclosure applies to all configurations of the user technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the user technology, and are not referred to in connection with the interpretation of the description of the user technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the user technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the user matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can, in some cases, be excised from the combination, and the described combination may be directed to a subcombination or variation of a subcombination.

The user matter of this specification has been described in terms of particular aspects, but other aspects can be implemented and are within the scope of the above claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, drawings and description thereof are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples, and the various features are grouped together in various implementations for the purpose of streamlining the disclosure. The method of disclosure is not to be interpreted as reflecting an intention that the described user matter requires more features than are expressly recited in each claim. Rather, as the claims reflect, inventive user matter lies in less than all features of a single disclosed configuration or operation. The claims are hereby incorporated into the detailed description, with each claim standing on its own as a separately described user matter.

The claims are not intended to be limited to the aspects described herein but are to be accorded the full scope consistent with the language claims and to encompass all legal equivalents. Notwithstanding, none of the claims are intended to embrace user matter that fails to satisfy the requirements of the applicable patent law, nor should they be interpreted in such a way.

What is claimed is:

1. A computer-implemented method, comprising:
receiving a signal from a sensor mounted on a headset worn by a user, the signal being indicative of a user intention for capturing an image;
receiving an indication of an orientation of the headset;
identifying the user intention for capturing the image, based on a model to classify the signal from the sensor according to the user intention;
selecting a first image capturing device in the headset based on a specification of the first image capturing device and the user intention for capturing the image, wherein a field of view of the first image capturing device is aligned with the orientation of the headset; and
capturing the image with the first image capturing device.

2. The computer-implemented method of claim 1, wherein receiving the signal from the sensor comprises one of receiving an inertial signal from an inertial motion sensor, receiving a sound capture from a user voice, receiving a hand gesture, or receiving an active button press.

3. The computer-implemented method of claim 1, wherein selecting the first image capturing device based on the specification of the first image capturing device comprises selecting the first image capturing device when the field of view of the first image capturing device includes a point of interest in a field of view for the user, in the headset.

4. The computer-implemented method of claim 1, further comprising de-activating the first image capturing device in the headset when the user intention is incompatible with the specification of the first image capturing device.

5. The computer-implemented method of claim 1, further comprising selecting, from one or more image capturing devices in the headset, an image capturing device whose specification best matches the user intention.

6. The computer-implemented method of claim 1, further comprising selecting a second image capturing device and de-activating the first image capturing device based on a second user intention.

7. The computer-implemented method of claim 1, wherein the specification of the first image capturing device is the field of view, and wherein selecting the first image capturing device comprises verifying that the field of view includes an object of interest identified within the user intention.

8. The computer-implemented method of claim 1, wherein receiving the signal from the sensor mounted on the headset comprises identifying a hand gesture of the user indicative of an object of interest.

9. The computer-implemented method of claim 1, wherein receiving the signal from the sensor comprises receiving a pupil position of the user from an eye tracking device mounted on the headset.

10. The computer-implemented method of claim 1, wherein receiving the indication of hte orientation of the headset comprises identifying the orientation of the headset, and selecting the first image capturing device when the field of view is aligned with the orientation of the headset.

11. An augmented reality headset, comprising:
a first camera and a second camera mounted on a frame, having a first field of view, and a second field of view, respectively;
a sensor mounted on the frame;
a memory configured to store multiple instructions; and
one or more processors configured to execute the instructions to cause the augmented reality headset to:
receive a signal from the sensor mounted on the frame, the signal being indicative of an intention of a user for capturing an image,
receive an indication of an orientation of the augmented reality headset,
identify the intention of the user for capturing the image, based on a model to classify the signal from the sensor according to the intention of the user,
select one of the first camera or the second camera based on the first field of view, the second field of view, and the intention of the user for capturing the image, wherein a field of view of a selected camera is aligned with the orientation of the augmented reality headset, and
capture the image with the selected camera.

12. The augmented reality headset of claim 11, wherein the sensor is an inertial motion unit, and to receive the signal from the sensor comprises identifying the orientation of the augmented reality headset relative to a fixed coordinate system.

13. The augmented reality headset of claim 11, wherein to select one of the first camera or the second camera the one or more processors execute instructions to select the first camera when the first field of view of the first camera includes a point of interest in a field of view for the user, in the augmented reality headset.

14. The augmented reality headset of claim 11, wherein the one or more processors execute instructions to de-activate the first camera when the second camera is selected, based on a second user intention.

15. The augmented reality headset of claim 11, wherein the sensor provides the signal indicative of a hand gesture of the user pointing to an object of interest.

16. The augmented reality headset of claim 11, wherein the sensor is an eye tracking device mounted on the frame, configured to provide the signal indicative of a pupil position of the user.

17. The augmented reality headset of claim 11, wherein the sensor is an inertial motion sensor configured to provide the signal indicative of the orientation of the augmented reality headset.

18. The augmented reality headset of claim 11, wherein the sensor is one of the first camera or the second camera, configured to capture a gesture of the user indicative of an object of interest.

19. The augmented reality headset of claim 11, wherein the sensor is a microphone configured to collect and identify a voice command indicative of the intention of the user.

20. The augmented reality headset of claim 11, wherein the sensor is a touch-sensitive sensor configured to receive a touch command from the user.

* * * * *